Dec. 26, 1961    E. O. SCHULZ-DU BOIS ET AL    3,015,072
THERMAL MASER
Filed Oct. 19, 1959
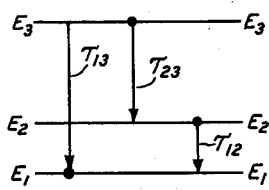
FIG. 1
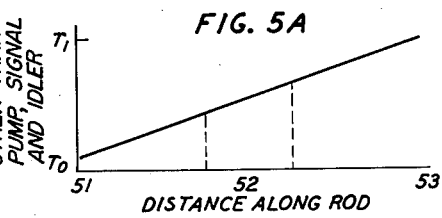
FIG. 4
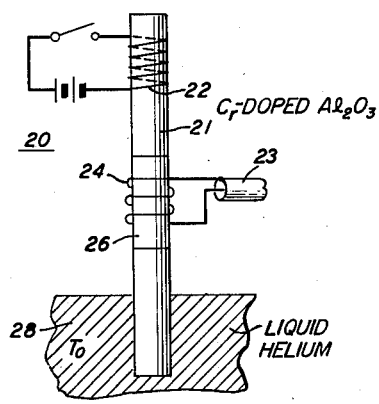
FIG. 2
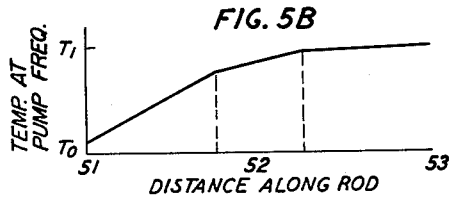
FIG. 5A
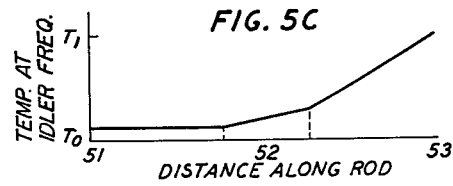
FIG. 5B
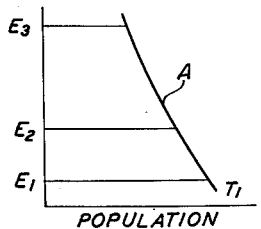
FIG. 3A
FIG. 5C
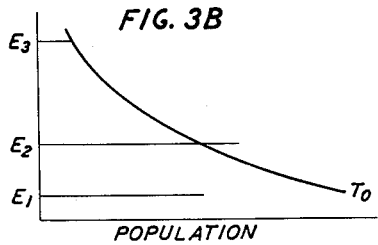
FIG. 3B
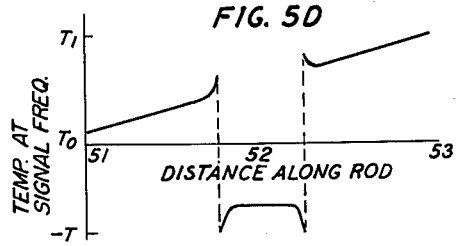
FIG. 5D
INVENTORS E. O. SCHULZ-DUBOIS
H. E. D. SCOVIL
BY
Arthur J. Torsiglieri
ATTORNEY

United States Patent Office 3,015,072
Patented Dec. 26, 1961

3,015,072
THERMAL MASER
Erich O. Schulz-Du Bois, Bedminster, and Henry E. D. Scovil, New Vernon, N.J., assignors to Bell Telephone Laboratories, Incorporated, New York, N.Y., a corporation of New York
Filed Oct. 19, 1959, Ser. No. 847,369
3 Claims. (Cl. 330—4)

This invention relates to apparatus for generating electromagnetic radiation directly from heat energy. In particular, it relates to masers which can be pumped by thermal processes.

It is known from the study of electron magnetic resonance that the normal population distribution among the energy levels of unpaired spinning electrons in paramagnetic materials may be altered by applying to the system wave energy having a frequency which corresponds to the separation between two given levels. The relation between the frequency and the separation is given by Bohr's equation $$\nu = \frac{E_2 - E_1}{h}$$

where $h$ is Planck's constant. It is characteristic of a system in thermal equilibrium that the population of the lower energy levels is greater than that of the upper levels. By applying a signal of the proper frequency and amplitude, however, it is possible to invert the equilibrium distribution so that the population of the upper of two levels is greater than that of the lower level.

One of the most promising forms of the maser is that in which the active material is characterized by three discrete energy levels. To operate such a device the active material is "pumped" with wave energy having a frequency corresponding to the transition between the lowest and the uppermost of the three levels. The material is generally selected so that the probability of the downward transition occurring in a single jump from the highest level all the way to the lowest level is less than the probability of the transition from the highest level to the intermediate one. Furthermore, if the number of transitions from the upper to the intermediate level tends to exceed the number of transitions from the intermediate to the lowest level, it can be seen that the population of the intermediate level will be increased by accumulation and that a population inversion will be established between the intermediate and the lower level. It is known that if a signal of frequency corresponding to the separation between two inverted energy levels is applied to the system the downward transition will be stimulated and radiation will be emitted coherently at that frequency, thus amplifying the signal.

Masers open up the attractive possibility of constructing amplifiers and oscillators for operation at very high frequencies extending from the microwave into the infrared, optical and ultra-violet regions of the electromagnetic spectrum. However, a major problem in operation of the three level maser at such frequencies arises from the fact that the pump frequency must be higher than the signal frequency. In the present state of the art it is still difficult to provide a great amount of power in a narrow band at very short wavelengths.

An object of our invention, therefore, is a new and improved means for generating and amplifying high frequency wave energy.

Another object of our invention is a means for directly converting heat energy into coherent electromagnetic radiation.

A further object of our invention is a maser which can be pumped by a readily available form of energy such as heat.

A feature of our invention is a paramagnetic crystal adapted to be heated at one end portion and cooled at the opposite end portion and having an intermediate region where the spin population is inverted. An interaction circuit is associated with the intermediate region.

Two illustrative embodiments will be described, one adapted for pulsed operation and the other for continuous operation.

In the embodiment adapted for continuous operation a crystal in rod form has its two ends maintained at different temperatures and an interaction circuit is coupled to the intermediate region. The crystal includes different paramagnetic ions in each of the two end portions and the intermediate region for reasons to be discussed.

The invention will be better understood from the following more detailed description, taken with the accompanying drawing, in which:

FIG. 1 illustrates diagrammatically an energy level configuration of the active material suitable for use in the invention;

FIG. 2 depicts an illustrative embodiment capable of intermittent amplification according to the principles of the invention;

Each of FIGS. 3A and 3B is a plot of population distribution among various energy levels and will be useful in a description of the embodiment shown in FIG. 2;

FIG. 4 illustrates in schematic form an embodiment of the invention capable of continuous amplification; and Each of FIGS. 5A through 5D is a graph of the temperature distribution at a particular frequency of the crystal employed in the embodiment shown in FIG. 4 and will be useful in a description of such embodiment.

Referring now more particularly to the drawing, there is shown in FIG. 1 an energy level diagram of a material suitable for use in a maser according to the invention. The three levels $E_1$, $E_2$ and $E_3$ denote levels of successively higher energies. The relaxation times between levels are indicated by the $\tau$'s with subscripts referring to the energy levels between which the transition occurs. Usually operation of a three level maser is accomplished under conditions where $\tau_{13}$ is less than $\tau_{12}$. Advantageously $\tau_{23}$ is substantially smaller than the other two relaxation times so that a large excess population can be maintained in the upper of the inverted pair of energy levels, thus permitting higher amplification or higher power oscillation.

In FIG. 2 there is depicted a thermally excited three level maser 20 illustrative of the invention. Advantageously, the rod 21 comprises a single crystal of an appropriate material, typically an elongated right circular cylinder, which has been ground to a suitable shape. A center portion 26 of the rod 21 is doped with paramagnetic ions having the necessary energy level characteristics. Typically, the rod may be of aluminum oxide having a central portion doped with chromium. Such chromium-doped portion will exhibit an energy level characteristic of the kind shown in FIG. 1.

One end of the rod is wound with a heater coil 22 by means of which, in conjunction with external circuitry including a potential source and a switch, it may be heated and allowed to cool periodically.

The other end of the rod is in thermal contact with a heat reservoir 28 which is maintained at a suitably low temperature $T_0$. The term "heat reservoir" is used in the specification to indicate any means for supplying heat energy to or absorbing such energy from the three level spin system in such a manner as to establish or maintain a particular thermometric temperature therein. The reservoir 28 might, for example, comprise a bath of liquified gas, such as helium, or any convenient refrigerating device in the maser so the reservoir 28 should be a good thermal contact with the rod 21 and should have a relatively large heat capacity so that the rod 21 can be substantially cooled in a time shorter than $\tau_{12}$.

The doped center portion 26 of the rod is inductively coupled to an interaction circuit shown as a helical winding 24. Transmission means, illustrated by the coaxial line 23, are connected to the interaction circuit 24 so that signal energy may be applied to, and an amplified replica thereof abstracted from, the active region 26 when the maser 20 is used as an amplifier, and so that coherent output wave energy may be abstracted therefrom when it is used as an oscillator.

To operate the maser, a current is first caused to pass through the resistance element 22 so that the associated end of rod 21 is heated. The active region 26 is thereby heated to a temperature above that of the reservoir 28, say to $T_1$, for example, about 20 degrees K. The current flow is then stopped and the rod is allowed to cool to the temperature of the reservoir 28, $T_0$. The rod is designed so that the thermal relaxation time is shorter than the spin lattice relaxation time so that the active region 26 cools thermometrically to temperature $T_0$ before the spin population arrives at the equilibrium distribution corresponding to such a temperature. The effect of such heating and cooling is illustrated in FIGS. 3A and 3B. When the central portion 26 reaches equilibrium at the temperature $T_1$, the spin population in such portion has the distribution shown in FIG. 3A, the horizontal length of the lines at levels $E_1$, $E_2$ and $E_3$ being a measure of the populations of such individual levels. The equilibrium Boltzmann distribution is shown by the curve A. After the heat is turned off and the central portion cools to temperature $T_0$ but before the spin population adjusts to the new equilibrium state, the spin population temporarily redistributes itself as shown by the horizontal lines of FIG. 3B. The spin population of level $E_2$ is increased at the expense of level $E_3$ as a result of the spin lattice relaxation processes. The spin population of level $E_1$ is also increased but to a lesser extent because of the longer spin lattice relaxation times at the expense of levels $E_2$ and $E_3$. As a result, the population of level $E_2$ can be made temporarily to exceed that of level $E_3$ and a negative spin temperature established therebetween. There is also shown plotted the Boltzmann distribution corresponding to the temperature $T_0$ which is the equilibrium distribution that will be reached with time. As can be seen, the populations of $E_1$ and $E_2$ are respectively smaller and larger than their Boltzmann equilibrium value.

Various materials exhibit the properties necessary for the rod 21. In particular, the rod 21 may comprise a single crystal sapphire ($Al_2O_3$) which has been ground to an appropriate shape. The active center portion 26 advantageously includes about .05 percent of chromium, thus forming pink ruby. When subject to liquid helium temperatures and a magnetic field of about 2,000 gausses perpendicular to its crystalline axis, this material will operate to provide emission at a frequency around 1,500 megacycles. The relaxation times at a temperature of 1.5 degrees K. are approximately as follows: $\tau_{12}=150$; $\tau_{13}=150$; $\tau_{23}=40$ milliseconds. The high thermal conductivity of the sapphire-ruby leads to a short thermal relaxation time of about ten microseconds, which is adequate in view of $\tau_{23}$.

The embodiment described is capable of amplifying only on an intermittent basis, periodically requiring heating and cooling of one end of the rod. For continuous operation, it is necessary to multiplex a plurality of such devices such that at any instant at least one is in a negative temperature state.

The embodiment shown in FIG. 4 is designed to avoid this problem. This embodiment is based on our discovery that the thermal conductivity along a paramagnetic crystal may be made frequency selective by appropriate doping of the crystal.

Heat conduction is accomplished, in the accepted view, by transmission of random sound energy of all frequencies. The particles of energy, usually referred to as phonons, are transmitted with the velocity of sound over lengths of the order of the mean free phonon path and then are scattered from a scattering center. At normal temperatures, it is not possible to relate the contribution of a particular frequency band to the total heat conductivity because Raman scattering processes occur which change the frequency of the incoming phonons. Thus, the identity of a narrow frequency band is lost after a short travel and it is converted into energy of essentially all frequencies.

At very low temperatures, however, Raman scatering becomes insignificant and energy contained within a narrow frequency band should stay within the band, the scattering then being elastic and leading to a change only in direction.

The embodiment being described involves the artificial reduction of the heat conductivity in a selected narrow frequency band. This may be done by a reduction of the phonon mean free path for this frequency band by the introduction of frequency selective sound scattering centers in the form of paramagnetic ions.

In the embodiment 50 illustrated in FIG. 4, a single crystal rod 55 is placed so that one end portion 57 thereof is in thermal contact with a heat reservoir 51 at a temperature $T_1$ and the other end portion 59 thereof is in thermal contact with a heat reservoir 53 at a lower temperature $T_0$. The portion 59 is doped with frequency selective phonon scattering centers in such a manner that its thermal conductivity at the pump frequency $\nu_{13}$ is reduced. The section 57 is doped with scatering centers which reduce its thermal conductivity at the idler frequency $\nu_{23}$. Advantageously, the crystal may be doped along both end portions to reduce heat conduction at the signal frequency.

In FIGS. 5A through 5D are plotted the temperature distribution at various frequencies along the length of the crystal. The plots are on a nonlinear scale so as to favor a linear distribution.

In FIG. 5A there is shown the distribution at all frequencies other than the three frequency bands of interest.

In FIG. 5B there is shown the temperature distribution at the pump frequency. At this frequency, the active portion 52 is essentially at the temperature $T_1$.

In FIG. 5C there is shown the temperature distribution at the idler frequency. At this frequency, the active region 52 is essentially at the temperature $T_0$.

In FIG. 5D there is shown the temperature distribution at the signal frequency. Because thermal conduction at the signal frequency along the end portions is poor, the intermediate active portion is able to remain at a negative temperature.

Accordingly, by this scheme of doping the active region 52 of the crystal 55 is insulated from the hot reservoir 53 at $\nu_{23}$, from the cold reservoir 51 at $\nu_{13}$ and from both reservoirs at the signal frequency $\nu_{12}$. Conversely, the active portion 52 is in good thermal contact with reservoir 53 at the pump frequency $\nu_{13}$ and with the reservoir 51 at the idler frequency $\nu_{23}$. As long as a temperature difference is maintained between the reservoirs the three level system in the active region 52 will receive pump energy from the hot side and discharge idler energy to the cold side. Since $\tau_{23}$ is substantially less than $\tau_{12}$ and $\tau_{13}$ there will be a population accumulation at intermediate level $E_2$ and a population inversion with respect to the signal frequency will be established in the region 52.

To utilize this population inversion, a microwave circuit, typically a helical conductor, surrounds the active portion 52 to one end of which is applied the input signal to be amplified and from the other end is abstracted the amplified output.

As has been indicated above, the desired frequency selectivity of the thermal conduction is achieved by paramagnetic ion doping of the crystal. Scattering of a particular frequency at a particular region is achieved by doping such region with paramagnetic ions having a pair of energy levels whose separation corresponds to the frequency to be scattered.

Typically, the rod may be a crystal of calcium tungstate ($CaWO_4$) with end region 57 including one percent of cerium, with end region 59 including one percent of erbium, and with intermediate region 52 including about one-tenth of one percent of gadolinium. To minimize thermal conduction at the signal frequency away from the intermediate active portion, the two end regions advantageously also may include about one percent neodymium. The concentration of impurity ions anywhere along the crystal should be low enough to avoid spin-spin interaction.

Many modifications, of course, are feasible within the spirit of the invention. Various other materials may be used as the diamagnetic host crystal doped with various other paramagnetic ions, thereby adapting the invention for operation under different conditions and in different frequency ranges. Furthermore, the hot and cold reservoirs may take a variety of forms and are not limited to the heating coils and helium baths which were adopted for purposes of the discussion.

Similarly, various other forms of interaction circuits may be used. Additionally, in an embodiment to be used as an oscillator, the circuit may be a structure resonant at the signal frequency, and there is obviated the need for an input connection, it being adequate simply to provide an output connection to the resonant structure.

What is claimed is:

1. A maser comprising a substantially monocrystalline element, the intermediate portion of the element including a concentration of paramagnetic ions having three energy levels whose separations define a pump frequency, an idler frequency and a signal frequency, one of the two ends of the element including a concentration of paramagnetic ions having a pair of energy levels whose separation corresponds to the pump frequency, and the other of the two ends of the element including a concentration of paramagnetic ions having a pair of energy levels whose separation corresponds to the idler frequency, means for maintaining said first-mentioned end at a lower temperature than said last-mentioned end for establishing a negative temperature at the signal frequency in said intermediate portion, the whole element being maintained at a temperature sufficiently low that Raman scattering is insignificant, and means coupled to the intermediate portion for utilizing the negative temperature established.

2. A maser in accordance with claim 1 in which the element is calcium tungstate, the first mentioned end including about one percent of cerium, the other end including about one percent of erbium and the intermediate portion including a fraction of a percent of gadolinium.

3. A maser comprising a substantially monocrystalline element of high thermal conductivity of which at least an intermediate portion includes a concentration of paramagnetic ions exhibiting three energy levels defining a pump frequency, an idler frequency and a signal frequency, the element and its temperature being such that the spin lattice relaxation time of the signal frequency transition is shorter than that of either the pump frequency transition or the idler frequency transition and longer than the thermal relaxation time of the crystal, means for maintaining one end of the element at a fixed low temperature, means for periodically heating and then allowing to cool the opposite end of the element for establishing a negative spin temperature at the signal frequency in said intermediate portion of the element, and means for utilizing said negative spin temperature coupled to said intermediate portion.

References Cited in the file of this patent

Giordmaine et al.: "Proceedings of the IRE," June 1959, pages 1062–1069.

"Masers" by Singer (1959), John Wiley & Sons, Inc. (page 118 relied on).